UNITED STATES PATENT OFFICE.

EDWIN G. RUST, OF PRIMGHAR, IOWA.

METAL-POLISH.

SPECIFICATION forming part of Letters Patent No. 580,225, dated April 6, 1897.

Application filed December 26, 1896. Serial No. 617,086. (No specimens.)

*To all whom it may concern:*

Be it known that I, EDWIN G. RUST, of Primghar, in the county of O'Brien and State of Iowa, have invented a new and useful Composition of Matter for Use as a Metal-Polish, of which the following is a full, clear, and exact description.

This invention relates to an improved composition of matter to be used for polishing stoves and other articles of metal.

The objects of my invention are to provide a metal-polish in liquid form, which is particularly well adapted to coat and polish rusted metal surfaces, such, for example, as the bodies of stoves and ranges, and which will be easy to render brilliant after application, which will be very durable, will not create smoke, odor, or dust when applied, and which may be readily removed from the hands of the person applying it by the use of water, and that will not render the hands of the user rough or otherwise injure their appearance after the removal of the polish therefrom.

The composition of matter forming the subject of my invention consists of the following ingredients compounded as hereinafter specified: powdered ivory-black, two pounds; powdered black-lead, two pounds; French gelatin, four ounces; quince-seed, one ounce; alcohol, twelve ounces; water, one gallon.

Formula for compounding the ingredients: The quince-seeds are steeped in one-half gallon of water for twenty-four hours to produce a mucilage. Then the shells of the seeds are strained out. Next dissolve the gelatin in one-half gallon of hot water. Stir together so as to thoroughly mix in a dry condition the ivory-black and the black-lead. Then while the gelatin mixture is still hot gradually introduce the black-lead and ivory-black, stirring the ingredients until thoroughly mixed. Lastly, add the alcohol and quince-seed mucilage, and complete the process by stirring until there is a smooth cream-like liquid blacking formed.

The use of the mucilage of quince-seed together with the gelatin renders the product superior in service, as it prevents stratification or separation of the heavy powdered material from the liquid portion. It also counteracts the animal odor that would be exhaled if gelatin only were used. The alcohol serves as a blending agent and tends to prevent the mixture from becoming sour or from freezing when the polish is exposed to extremes of heat or cold.

In use the polishing liquid is freely applied to a metal surface which is to be rendered black and very brilliant, preferably by spreading the liquid on with a soft brush. The material quickly dries, and when in that condition may be polished with but little labor by the application of a dry brush or a soft cloth.

The use of the quince-seed mucilage, as described, is found to greatly aid the removal of any of the compound which may soil the hands of the user while applying the polish, as the application of warm or even cold water to the soiled hands will at once dissolve the black coating and readily wash it from the hands. The emulsified extract from the quince-seeds has a saponaceous action that softens as well as cleanses the hands of the operator when they are washed, as stated.

I desire it to be understood that I do not limit myself to the exact proportions herein specified of the ingredients of the polish, as for certain metals the polish may be required to be thinner, and, furthermore, when the polish is put up in bulk for dealers' use it will be different in the proportions of its ingredients than when put up in small packages for family use.

Having thus described my invention, I claim as new and desire to secure by Letters Patent—

The herein-described composition of matter, to be used as a metal-polish, consisting of ivory-black, black-lead, quince-seed mucilage, gelatin, alcohol and water combined as described and substantially in the proportions specified.

EDWIN G. RUST.

Witnesses:
  GEO. R. SLOCUM,
  CHARLES H. SLOCUM.